United States Patent [19]

Rogozinski et al.

[11] Patent Number: 4,857,816

[45] Date of Patent: Aug. 15, 1989

[54] PRECISE POSITIONING APPARATUS

[76] Inventors: Joseph Rogozinski, 14 Motza Street, 52366 Ramat Gan; Ilan Cohen, 90 Zahal St., Kiron, both of Israel

[21] Appl. No.: 107,481

[22] Filed: Oct. 8, 1987

[30] Foreign Application Priority Data

Feb. 5, 1987 [IL] Israel ................................. 81487
Sep. 10, 1987 [IL] Israel ................................. 83854

[51] Int. Cl.$^4$ ........................................... G05B 11/01
[52] U.S. Cl. ..................................... 318/632; 318/630
[58] Field of Search ............... 318/565, 566, 567, 568, 318/620, 630, 632, 652; 364/170, 174, 176

[56] References Cited

U.S. PATENT DOCUMENTS

| 3,689,821 | 9/1972 | Slawson | 318/632 |
|---|---|---|---|
| 3,731,178 | 5/1973 | Schwanemann | 318/620 |
| 3,886,424 | 5/1975 | Hoshina et al. | 318/630 |
| 4,218,956 | 8/1980 | Uno et al. | 364/174 X |
| 4,249,117 | 2/1981 | Leukhardt et al. | 318/566 X |
| 4,404,626 | 9/1983 | Aoyama | 364/176 X |
| 4,558,424 | 12/1985 | Oguchi et al. | 364/170 X |
| 4,580,299 | 4/1986 | Koyama et al. | 364/513 |
| 4,638,221 | 1/1987 | Brignall | 318/632 X |

FOREIGN PATENT DOCUMENTS

| 0066673 | 12/1982 | European Pat. Off. |
| 0072870 | 3/1983 | European Pat. Off. |
| 0148269 | 7/1985 | European Pat. Off. |
| 59-123485 | 7/1984 | Japan | 364/176 |
| 1062641 | 12/1983 | U.S.S.R. | 364/176 |

OTHER PUBLICATIONS

Whitney, D., "Historical Perspective and State of the Art in Robot Force Control", *International Journal of Robotics Research*, vol 6, No. 1, Spring, 1987, pp. 3–14.

Luh, J., et al., "Joint Torque Control by a Direct Feedback for Industrial Robots", *IEEE Transactions on Automatic Control*, vol. 28, No. 2, Feb. 1983, pp. 153–156 & 158–160.

Vidyasagar, M., "System Theory and Robotics", *IEEE Control Systems Magazine*, Apr., 1987, pp. 16–17.

*Primary Examiner*—Bentsu Ro
*Attorney, Agent, or Firm*—Ladas & Parry

[57] ABSTRACT

Positioning apparatus comprising driving apparatus to a load, position sensing apparatus coupled to the driving apparatus, apparatus for sensing input power to the driving apparatus, inaccuracy compensation control apparatus receiving a first input from the position sensing apparatus indicating the position of the driving apparatus and a second input from the apparatus for sensing input power and providing a compensated output indication indicating the position of the load on the basis of information regarding non-linearities in position changes between the driving apparatus and the load including information indicative of whether or not the load is driving the driving apparatus or the driving apparatus is driving the load.

31 Claims, 9 Drawing Sheets

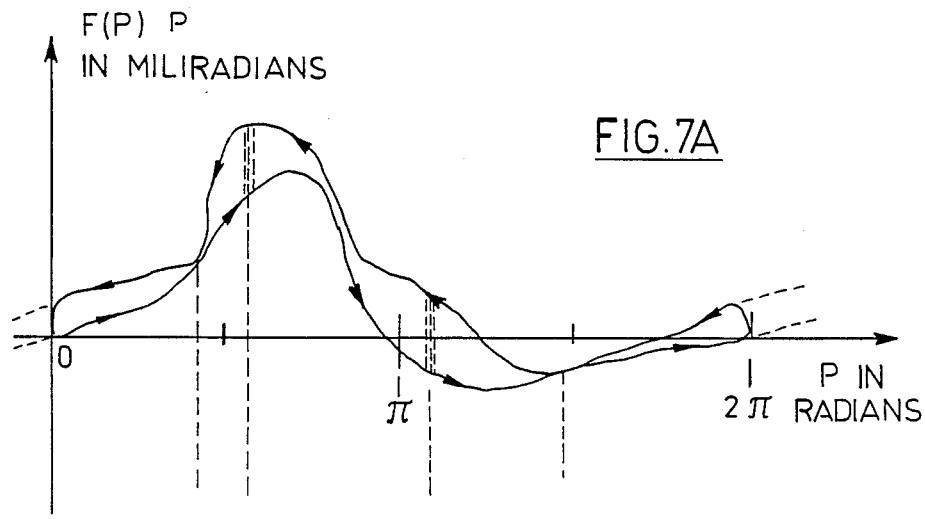
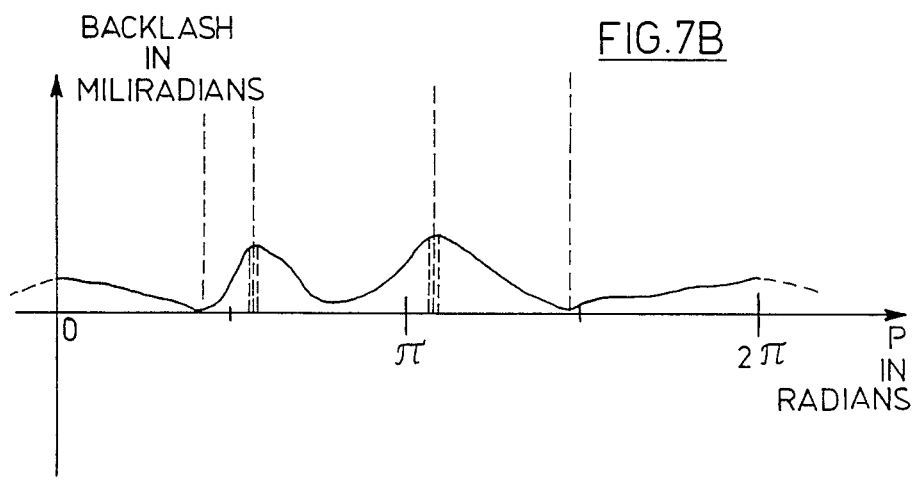

PRECISE POSITIONING APPARATUS

FIELD OF THE INVENTION

The present invention relates to positioning mechanisms generally and more particularly to positioning mechanisms employing motors for precise positioning.

BACKGROUND OF THE INVENTION

Various applications, such as robotics, require extremely precise positioning of mechanical elements, such as robot arms. Typically, such precise positioning is achieved by employing an electric motor, a reducing gear transmission, such as a harmonic drive gear, a shaft encoder and a tachometer. Both the tachometer and the shaft encoder provide output data to servo mechanisms which in turn provide position correction signals to the motor.

Normally the shaft encoder and the tachometer are directly mounted on the electric motor, downstream of the transmission. It may be appreciated that in this configuration, whatever the accuracy of the shaft encoder and the electric motor, such is not the accuracy of the positioning of the element driven thereby due to inaccuracies introduced by the transmission, as well as inaccuracies due to flexing of driven elements downstream of the transmission.

Positioning accuracies realized by conventional positioning devices of the type described hereinabove are of the order of milliradians to hundreds of microradians for rotary applications and of the order of hundredths or tenths of millimeters for linear applications.

Some of the inaccuracies associated with the transmission itself could be overcome by mounting a shaft encoder at the output of the gear, which is directly coupled to the driven element. This, however is impractical in most robotics applications due to space and weight limitations, complications in mounting, limitations on the movement of the robot, and cost.

A closed loop torque sensing and control system is described in "Joint Torque Control by a Direct Feedback for Industrial Robots" by J. Y. S. Luh, W. D. Fisher and Richard P. C. Paul, IEEE Transactions on Automatic Control, Vol. AC-28 No. 2 February 1983, pp. 153–160.

Compensation for bending of a load arm is described in "A Robot-Arm with Compensation for Bending" by P. C. Mulders et al, Annals of the CIRP, 35/1/1986 pp. 305–308.

The current state of the art is described in M. Vidyasagar, "System Theory and Robotics", IEEE Control Systems Magazine, Vol 7, No. 2, April, 1987, pp 16 and 17.

SUMMARY OF THE INVENTION

The present invention seeks to provide precise positioning and driving apparatus whose performance characteristics are significantly improved over the prior art.

There is thus provided in accordance with a preferred embodiment of the present invention positioning apparatus comprising driving apparatus to a load, position sensing apparatus coupled to the driving apparatus, apparatus for sensing input power to the driving apparatus, inaccuracy compensation control apparatus receiving a first input from the position sensing apparatus indicating the position of the driving apparatus and a second input from the apparatus for sensing input power and providing a compensated output indication indicating the position of the load on the basis of information regarding non-linearities in position changes between the driving apparatus and the load including information indicative of whether or not the load is driving the driving apparatus or the driving apparatus is driving the load.

There is also provided in accordance with a preferred embodiment of the present invention positioning apparatus comprising driving apparatus to a load, position sensing apparatus coupled to the driving apparatus, apparatus for sensing input power to the driving apparatus, inaccuracy compensation control apparatus receiving a first input from the position sensing apparatus indicating the position of the driving apparatus and a second input from the apparatus for sensing input power and providing a compensated output indication indicating the force (which may include the torque) at the output of the transmission on the basis of information regarding nonlinearities in position changes between the driving apparatus and the load including information as to whether or not the load is driving the motor or the motor is driving the load.

There is additionally provided in accordance with a preferred embodiment of the present invention positioning apparatus comprising driving apparatus to a load, position sensing apparatus coupled to the driving apparatus, apparatus for sensing input power to the driving apparatus, inaccuracy compensation control apparatus receiving a first input from the position sensing apparatus indicating the position of the driving apparatus and a second input from the apparatus for sensing input power and providing a compensated output indication indicating the velocity of the load on the basis of information regarding non-linearities in position changes between the driving apparatus and the load including information as to whether or not the load is driving the motor or the motor is driving the load.

In accordance with a preferred embodiment of the invention, the temperature of the driving apparatus is also sensed and employed in providing a compensated output indication.

BRIEF DESCRIPTION OF THE DRAWINGS

The present invention will be understood and appreciated more fully from the following detailed description taken in conjunction with the drawings in which:

FIGS. 7A and 7B are diagrams showing linearization error and backlash correction provided in accordance with a preferred embodiment of the present invention;

DETAILED DESCRIPTION OF A PREFERRED EMBODIMENT

Figure 1:
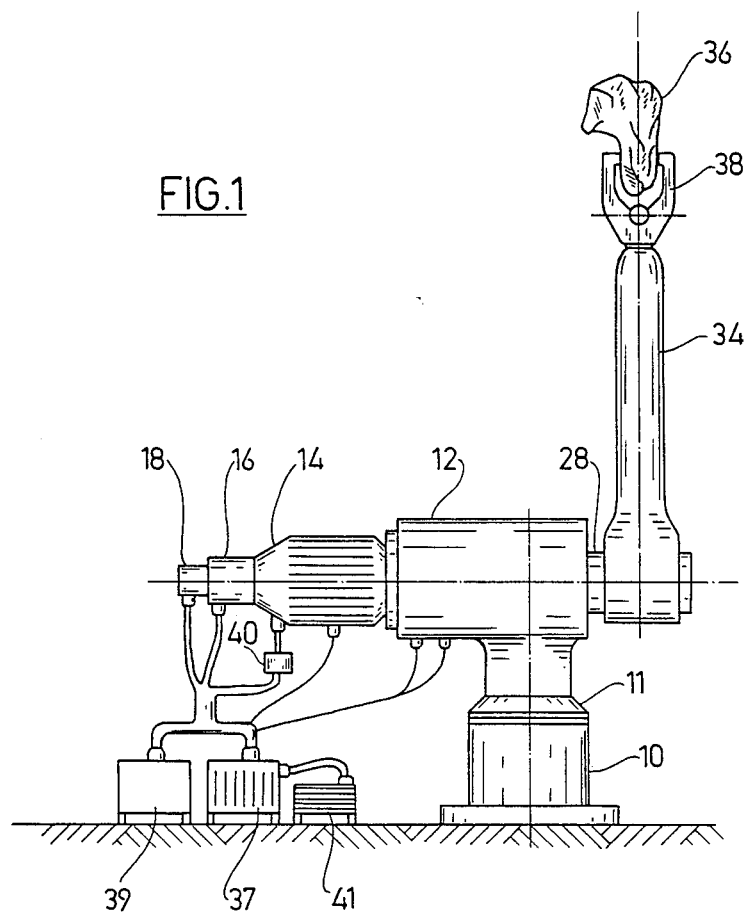
FIG. 1 is a side view illustration of positioning apparatus constructed and operative in accordance with a preferred embodiment of the present invention.
Figure 2:
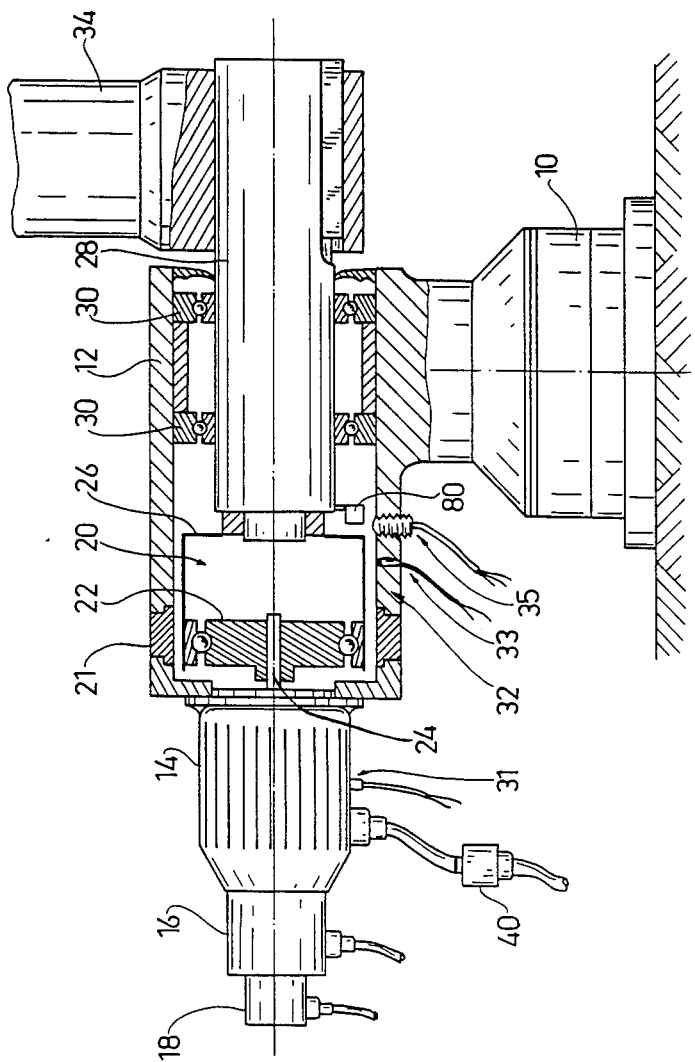
FIG. 2 is a partially cut away illustration of part of the apparatus of FIG. 1.
Figure 3:
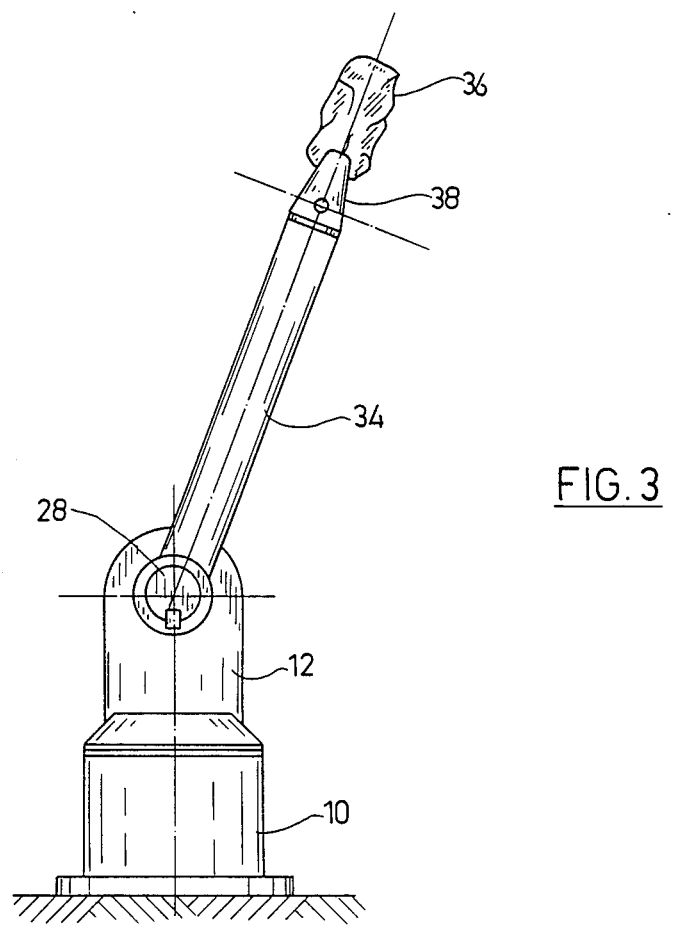
FIG. 3 is an end view illustration of the apparatus of FIG. 1.

Reference is now made to FIGS. 1–3, which illustrate positioning apparatus constructed and operative in accordance with a preferred embodiment of the present invention. In the illustrated embodiment, the positioning apparatus comprises a base 10 onto which is mounted a rotatable turret 11. A transmission 12 is, in turn, mounted onto turret 11. A rotary power source 14, here an electric motor, is arranged to drive the transmission 12. A shaft encoder 16 and a tachometer 18 are operatively connected with the rotary power source 14 for providing output indications of position and rotary velocity respectively of the rotary power source 14.

According to a preferred embodiment of the present invention, the transmission 12 comprises a harmonic drive gear 20, such as one available from Harmonic Drive GmbH, of Langen, West Germany, and includes a circular spline 21 fixed to the transmission housing, wave generator 22, which is mounted onto the output shaft 24 of the rotary power source 14 for rotation together therewith and a flexspine 26 onto which is mounted a transmission output shaft 28, which is bearing mounted onto bearings 30 within a transmission housing 32.

A thermocouple 31 is typically mounted onto the interior of the housing of the rotary power source 14. A thermocouple 33 is typically mounted in communication with the interior of transmission housing 32 for providing a temperature output indication.

An elongate first arm 34 is mounted onto output shaft 28. A load 36 is held at the extreme end of arm 34, as by a gripper 38. It is expressly noted that the term load is used throughout to indicate a specific location whose position, velocity and force is to be determined in accordance with the present invention. Thus the load may be, as illustrated, external to the positioning apparatus, or alternatively, in certain cases, may be a location on the positioning apparatus itself. A motor driver, such as a HS 220-6 available from Harmonic Drive GmbH, is shown at reference numeral 37 and is seen to be associated with logic circuitry 39, a current transducer 40 and a transformer 41.

Figure 4:
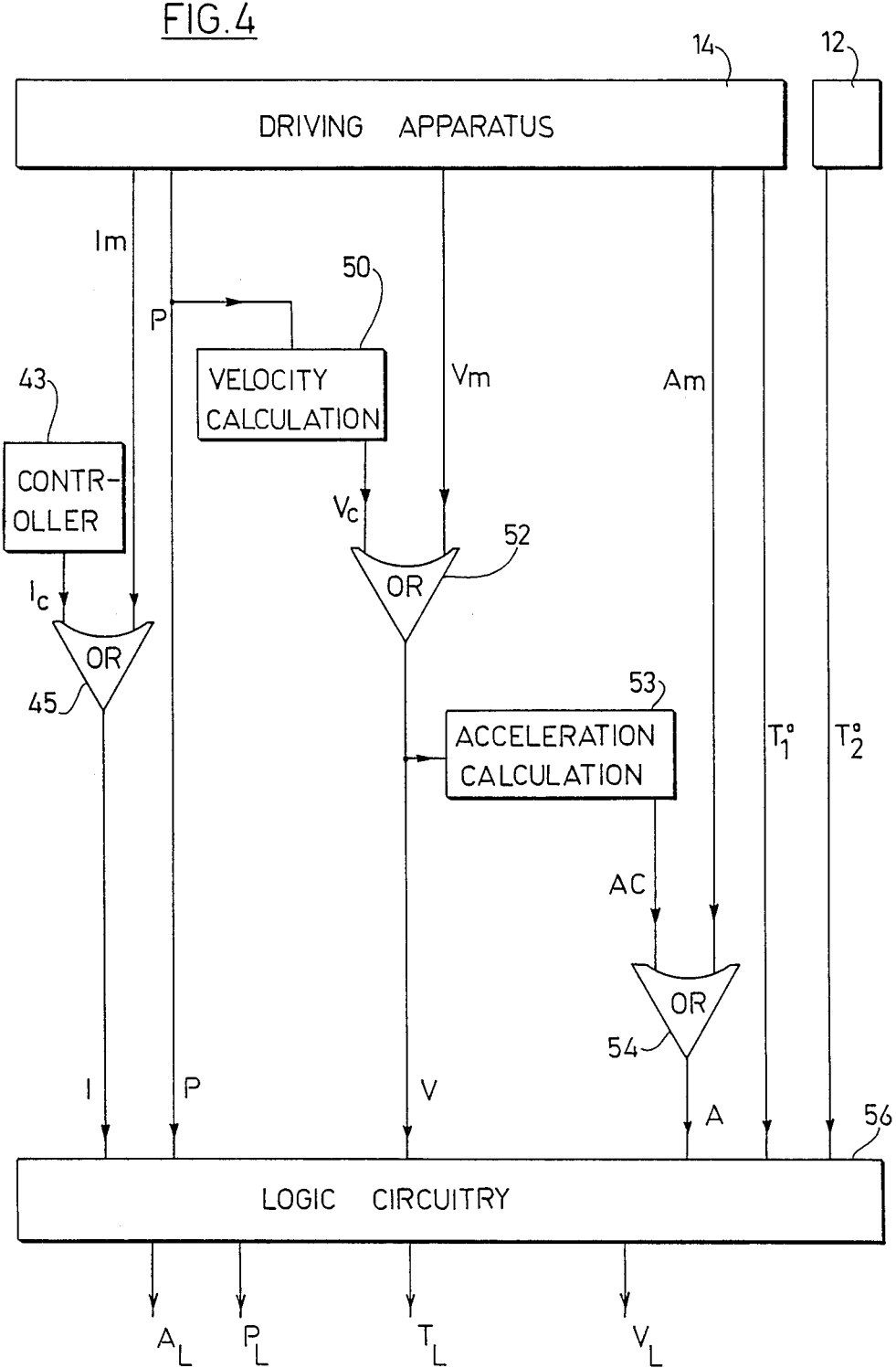
FIG. 4 is a block diagram illustration of load kinematics determination circuitry constructed and operative in accordance with a preferred embodiment of the present invention.

Reference is now made additionally to FIG. 4 which illustrates the operation of the apparatus illustrated in FIGS. 1–3 and particularly the logic circuitry 39. In accordance with a preferred embodiment of the invention the input power I of the driving apparatus is measured. In the illustrated embodiment, where the driving apparatus comprises a rotary electric motor, the input power I may be measured by a current transducer 40 such as a DC current sensor commercially available from American Aerospace Controls Inc. of Farmingdale, N.Y., which measures the input electrical current to the motor. The position P of the driving apparatus is also measured, in the illustrated example, by shaft encoder 16.

According to the illustrated embodiment of the invention, the measured velocity $V_m$ of the driving apparatus is measured by tachometer 18 and the measured acceleration $A_m$ of the driving apparatus is calculated from the velocity. Alternatively it may be measured by an angular accelerometer (not shown). The temperature $T_1°$ of the driving apparatus is also measured in the preferred embodiment of the invention by a thermocouple 31. The temperature $T_2°$ of the transmission is also measured in the preferred embodiment of the invention by a thermocouple 33. Alternatively measurements of any or all of the parameters $V_m$, $A_m$ and $T°$ may be eliminated.

In cases where $V_m$ is not position measured, the position measured value of P is supplied to a velocity calculation circuit 50 which provides an output representing a calculated value of the velocity of the driving apparatus $V_c$ in accordance with the following expression:

$$Vc = \frac{P(t) - P(t - T)}{T} \quad (1)$$

where T is the time between two measurements of P, and t is the time of the second measurement of P.

A logic OR function 52 selects either $V_m$ or $V_c$ according to which is available and provides an output V representing the velocity of the driving apparatus.

In cases where $A_m$ is not measured, the measured or calculated value of V may be supplied to an acceleration calculation circuit 53 which provides an output representing a calculated value of the acceleration of the driving apparatus $A_c$ in accordance with the following expression:

$$Ac = \frac{V(t) - V(t - T)}{T} \quad (2)$$

where T is the time between two measurements of V, and t is the time of the second measurement of V.

A logic OR function 54 selects either $A_m$ or $A_c$ according to which is available and provides an output A representing the velocity of the driving apparatus.

The parameters input power I, position P, velocity V, acceleration A and normally temperature of the driving apparatus and of the transmission $T_1°$, $T_2°$ are supplied to logic circuitry 56 which provides output indications PL, VL and TL which represent the position and velocity respectively of the load 36, and the torque or force of the output of the transmission 12.

Figure 5:
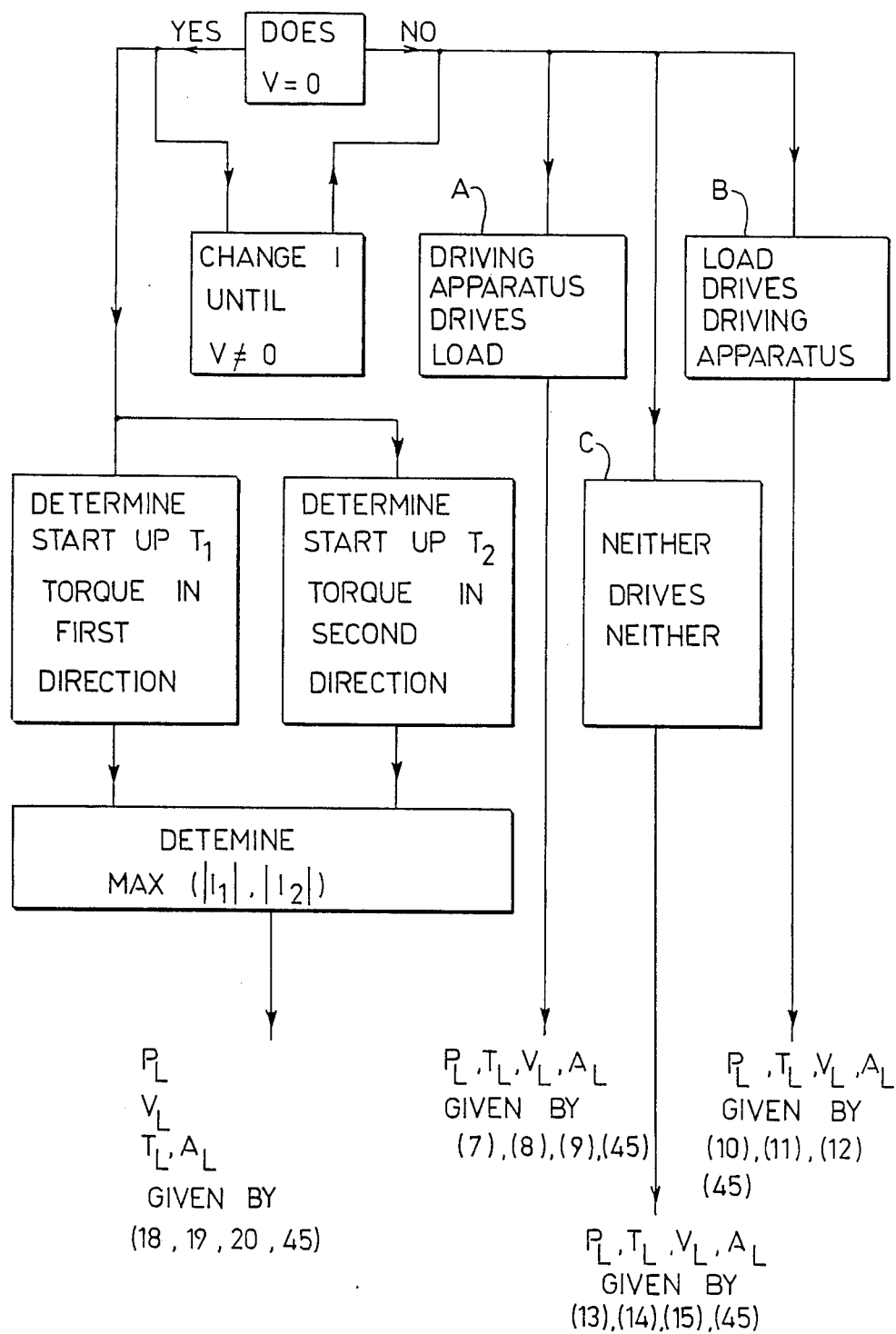
FIG. 5 is a flow chart illustrating the operation of the logic circuitry forming part of the apparatus of FIG. 4.

Referring now to FIG. 5, it is seen that the logic circuitry 56 carries out the following determinations:

1. Is V equal to zero?

If V is found not to be equal to zero then which of the following conditions is fulfilled:

A. The driving apparatus is driving the load
B. The load is driving the driving apparatus
C. Neither is driving the other Condition A is represented by the following expression:

$$\{GI + HV + JA + K \text{ (Sign } V)\} \text{ (Sign } V) \geq 0 \quad (3)$$

Condition B is represented by the following expressions:

$$\{GI + HV + JA + K \text{ (Sign } V)\} \text{ (Sign } V) < 0 \quad (4)$$

and $$\{LI + MV + NA + Q \text{ (Sign } V)\} \text{ (Sign } V) \geq C_1 \quad (5)$$

Condition C is represented by the following expressions:

$$\{GI+HV+JA+K \text{ (Sign } V)\} \text{ (Sign } V) < 0 \qquad (4)$$

and $$\{LI+MV+NA+Q \text{ (Sign } V)\} \text{ (Sign } V) < C_1 \qquad (6)$$

In all of the above expressions, G, H, J, K, L, M, N, $C_1$ and Q are all temperature dependent constants.

If condition A obtains then the position, torque and velocity of the load are given by the following expressions:

$$PL = R\{GI + HV + JA + K \text{ (Sign } V)\} + F(P) \qquad (7)$$

$$TL = \{GI + HV + JA + K \text{ (Sign } V)\} \qquad (8)$$

$$VL = \frac{PL(t) - PL(t - T)}{T} \qquad (9)$$

If condition B obtains, then the position, torque and velocity of the load are given by the following expressions:

$$PL = R\{LI + MV + NA + Q \text{ (Sign } V)\} + F(P) \qquad (10)$$

$$TL = \{LI + MV + NA + Q \text{ (Sign } V)\} \qquad (11)$$

$$VL = \frac{PL(t) - PL(t - T)}{T} \qquad (12)$$

If condition C obtains, then the position, torque and velocity of the load are given by the following expressions:

$$PL = R\{SI + TV + UA + W \text{ (Sign } V)\} + F(P) \qquad (13)$$

$$TL = \{SI + TV + UA + W \text{ (Sign } V)\} \qquad (14)$$

$$VL = \frac{PL(t) - PL(t - T)}{T} \qquad (15)$$

In the above expressions S, T, U and W are temperature and velocity dependent constants, R is an empirical function of $\{LI+MV+NA+Q \text{ (Sign V)}\} \text{ (Sign V)}$ and $F(P)$ is an empirical linearization table function of P.

If V is equal to zero, the input power I is changed until V just becomes not equal to zero and then the above process is carried out. Alternatively, the input power I may be changed in a first direction until V just becomes not equal to zero. At this stage the start up torque in a first direction is determined in accordance with the following expression:

$$T_1 \text{ is proportional to } GI \qquad (16)$$

The current which satisfies this expression is termed $I_1$.

The input power I is then changed in a second direction until V once again just becomes not equal to zero. At this stage the start up torque in a second direction is determined in accordance with the following expression:

$$T_2 \text{ is proportional to } GI \qquad (17)$$

The current which satisfies this expression is termed $I_2$.

Then, if $I_3$ is set to be equal to the maximum of the absolute values of $I_1$ and $I_2$, and if I is set to equal to $I_3$, then:

$$PL = R\{GI+HV+JA+K(\text{sign } V)\}+F(P) \qquad (18)$$

assuming that A and V exist at this point.

$$TL = GI + HV + JA + K \text{ (sign } V) \qquad (19)$$

$$VL = \frac{PL(t) - PL(t - T)}{T} \qquad (20)$$

It is a particular feature of the present invention that based on the knowledge of which of cases A, B and C above obtains, an appropriate backlash correction is automatically included in the PL, TL, VL outputs indicated in FIG. 5.

When the driving apparatus is driving the load, and when the load is driving the driving apparatus, the direction and size of the required backlash correction is known and included in the PL, TL and VL outputs. If neither the load is driving the driving apparatus nor the driving apparatus is driving the load, then the PL, TL and VL outputs make an appropriate correction based on a knowledge of the previous direction of movement.

For the purposes of explanation, details of a particular embodiment shown in FIGS. 1-3 will now be set forth, it being appreciated that the example and the details do not limit the scope of the present invention in any way and are given only by way of example.

The driving apparatus 14, shaft encoder 16 and tachometer 18 are embodied in a HT-25-3014-TE-500Z available from Harmonic Drive GmbH, of Langen, West Germany. The transformer 41 is a PT 656S, also available from Harmonic Drive GmbH. The stiffness coefficient $K_s$ of the transmission is 14,500 Newton-meter/radian. The first arm 34 may either be a rigid arm having a length of 800 mm, a weight of 6 Kg, and a stiffness coefficient $K_s$ of 70,500 Newton-meter/radian, or a flexible arm having a length of 800 mm, a weight of 800 gram, and a stiffness coefficient $K_s$ of 315 Newton-meter/radian.

In accordance with the preferred embodiment of the present invention described hereinabove the various constants are determined as follows:

Referring to equation (3), temperature dependent constants G, H and K are defined by the following expressions:

$$G = (1-a)K_T r \text{ (in Newton-meter/ampere)} \qquad (21)$$

$$H = -[(1-a)B_m + B_a]/r \text{ (in Newton-meter/radian/sec)} \qquad (22)$$

$$K = -[(1-a)T_{fm} + T_a] \text{ (in Newton-meter)} \qquad (23)$$

where $K_T$ is the motor constant of rotary power source 14, expressed in units of Newton-meter/ampere, which is a function of the operating temperature measured at the rotary power source by thermocouple 31.

a is a constant (dimensionless) which represents the fact that the rotary power source 14 is driving the load and is dependent on the temperature of the transmission 12, as measured by thermocouple 33;

r is the gear ratio (dimensionless) of transmission 12;

$B_m$ is the motor viscosity factor of the rotary power source 14 related to the output of the harmonic drive transmission 12, expressed in Newton-meter/radian/sec;

$B_a$ is part of the viscosity factor of the harmonic drive transmission 12, related to the output of the harmonic drive transmission, when the rotary power source 14 is driving the load, expressed in Newton-meter/radian/sec;

$T_{fm}$ is the motor coloumbic friction of the rotary power source 14 related to the output of the harmonic drive transmission 12, expressed in Newton-meter; and $T_a$ is part of the harmonic drive transmission coloumbic friction of transmission 12, related to the output of the harmonic drive transmission, when the rotary power source 14 is driving the load, expressed in Newton-meter.

The constants G, H and K are found by an empirical initialization process as follows:

The apparatus of FIGS. 1–3 is operated at constant velocity V from an orientation where the first arm 34 is generally horizontal moving up through about 45 degrees, in both clockwise and counter-clockwise directions, such that it is certain that the rotary power source 14 is driving the load. At each sampling time, typically every 10 milliseconds, the following parameters are measured and stored:

I (input power in amperes)
V (rotary power source velocity in radian/sec)
P (position of the power source given by shaft encoder 16 in radians)

This procedure is repeated for a multiplicity of different constant velocities.

The unbalance moment $T_{ext}$ of the first arm 34 is given as follows for the above initialization process:

$$GI + HV + K(\text{Sign } V) = T_{ext} \tag{24}$$

This equation is solved using the sampled data by known computer techniques of parameter identification such as the Least Square Method, or the Simplex Method, which is described in "The Simplex Technique as a General Optimization Method" by Ilan Cohen, et al, IFAC Workshop on Applications on Non-Linear Programming to Optimization and Control, San Francisco, 1983, Pergammon Press.

If it is not desired to rotate the first arm 34 in opposite directions of rotation, $T_{ext}$ must be calculated for each sample in accordance with the following expression:

$T_{ext}$ = mass of first arm 34 × distance of center of gravity from the center of rotation × g (gravitational constant) × cosine of the position of the first arm (25)

where the horizontal position is deemed to be at zero degrees and the upwards rotation in a counterclockwise direction is deemed to be of positive sign.

Referring to equation (3), the temperature dependent constant J is defined by the following expression:

$$J = (1-a)J_{eq}/r \text{(in Kg-m)} \tag{26}$$

where $J_{eq}$ is the equivalent moment of inertia of the rotary power source 14 reflected to the output of the harmonic drive transmission and the moment of inertia of the harmonic drive transmission reflected to the output of the harmonic drive transmission.

The constant J is found by an empirical process as follows:

The apparatus of FIGS. 1–3 is operated at constant acceleration A from an orientation where the first arm 34 is generally horizontal moving up through about 45 degrees, in both clockwise and counter-clockwise directions, such that it is certain that the rotary power source 14 is driving the load. At each sampling time, typically every 10 milliseconds, the following parameters are measured and stored:

I (input power in amperes)
V (rotary power source velocity in radian/sec) to provide an indication of acceleration using equation (2).
P (position of the power source given by shaft encoder 16 in radians)

This procedure is repeated for a multiplicity of different constant accelerations.

The unbalance moment $T_{ext}$ of the first arm 34 is given as follows for the above initialization process:

$$JA + GI + HV + K(\text{Sign } V) = T_{ext} \tag{27}$$

This equation is solved as set forth hereinabove using the same general techniques mentioned in connection with Equation (24). This equation is redundant to equation (24) and thus solutions of both equations together provide an improved estimation of J, G, H and K.

In order to increase the accuracy of the final product, the above initialization procedures are carried out for a multiplicity of different temperatures to enable extrapolation or interpolation of the parameters for all temperatures $T_1°$ and $T_2°$ over a given range.

Referring to equation (5), temperature dependent constants L, M and Q are defined by the following expressions:

$$L = (1-b)K_T/r \text{ (in Newton-meter/ampere)} \tag{28}$$

$$M = -[(1-b)B_m + B_b]/r \text{ (in Newton-meter/radian/sec)} \tag{29}$$

$$Q = -[(1-b)T_{fm} + T_b]/r \text{ (in Newton-meter)} \tag{30}$$

b is a constant (dimensionless) which represents the fact that the load is driving the rotary power source and is dependent on the temperature of the transmission 12, as measured by thermocouple 33;

$B_b$ is part of the viscosity factor of the harmonic drive transmission 12, related to the output of the harmonic drive transmission, when the load is driving the rotary power source 14, expressed in Newton-meter/radian/sec;

$T_b$ is part of the harmonic drive transmission coloumbic friction of transmission 12, related to the output of the harmonic drive transmission, when the load is driving the rotary power source 14, expressed in Newton-meter.

The constants L, M and Q are found by an empirical initialization process as follows:

The apparatus of FIGS. 1–3 is operated at constant velocity V from an orientation where the first arm 34 is generally horizontal moving down through about −45 degrees, in both clockwise and counter-clockwise directions, such that it is certain that the load is driving the rotary power source 14. At each sampling time, typically every 10 milliseconds, the following parameters are measured and stored:

I (input power in amperes)
V (rotary power source velocity in radian/sec)
P (position of the power source given by shaft encoder 16 in radians)

This procedure is repeated for a multiplicity of different constant velocities.

The unbalance moment $T_{ext}$ of the first arm 34 is given as follows for the above initialization process:

$$LI + MV + Q(\text{Sign } V) = T_{ext} \tag{31}$$

This equation is solved as set forth hereinabove using the same general techniques mentioned in connection with Equation (24).

If it is not desired to rotate the first arm 34 in opposite directions of rotation, $T_{ext}$ must be calculated for each sample in accordance with expression (25), where the horizontal position is deemed to be at zero degrees and the downwards rotation in a clockwise direction is deemed to be of negative sign.

Referring to equation (3), the temperature dependent constant N is defined by the following expression:

$$N = (1-b)J_{eq}/r \text{(in Kg-m}^2\text{)} \tag{32}$$

The constant N is found by an empirical initialization process as follows:

The apparatus of FIGS. 1-3 is operated at constant acceleration A from an orientation where the first arm 34 is generally horizontal moving down through about −45 degrees, in both clockwise and counter-clockwise directions, such that it is certain that the load is driving the rotary power source 14. At each sampling time, typically every 10 milliseconds, the following parameters are measured and stored:

I (input power in amperes)

V (rotary power source velocity in radian/sec) to provide an indication of acceleration using equation (2).

P (position of the power source given by shaft encoder 16 in radians)

This procedure is repeated for a multiplicity of different constant accelerations.

The unbalance amount $T_{ext}$ of the first arm 34 is given as follows for the above initialization process:

$$NA + LI + MV + Q(\text{Sign } V) = T_{ext} \tag{33}$$

This equation is solved as set forth hereinabove using the same general techniques mentioned in connection with Equation (24).

The above initialization procedures are carried out for a multiplicity of different temperatures to enable extrapolation and interpolation of the parameters for all temperatures and $T_1°$ and $T_2°$ over a given range.

Referring to equation (5), temperature dependent constant $C_1$, dimensioned in Newton-meter, is determined by the following initialization procedure:

The apparatus of FIGS. 1-3 is operated at constant velocity V from an orientation where the first arm 34 is generally oriented at 45 degrees above the horizontal moving up until it reaches a generally vertical orientation, in either or both clockwise and counter-clockwise directions, such that it is certain that the rotary power source 14 is driving the load. At each sampling time, typically every 10 milliseconds, the following parameters are measured and stored:

I (input power in amperes)

V (rotary power source velocity in radian/sec)

P (position of the power source given by shaft encoder 16 in radians)

The unbalance moment $T_{ext}$ of the first arm 34 is given by expression (25).

If the expression (24) is found not to be compatible with expression (25) at a given angle of orientation of first arm 34, then at this angle:

$$C_1 = GI + HV + K(\text{sign } V) \tag{34}$$

where I and V are measured corresponding to that given angle.

The above initialization procedures are carried out for a multiplicity of different temperatures to enable extrapolation of the parameters for all temperatures $T_2°$ over a given range.

Referring now to equation (7), the function R is given by the following expression:

$$R = \frac{TL}{K_s} \tag{35}$$

where $K_s$ is the equivalent stiffness coefficient of the first arm and of the harmonic drive transmission, expressed in Newton-meter/radian.

$K_s$ is determined empirically by applying a predetermined force perpendicular to a vertically directed first arm 34 at the location of the load and measuring the difference in angular orientation $D_A$ of the load location between cases when the force is present and when it is absent using a closed position loop control on the driving apparatus to hold it in position.

Figure 9A:
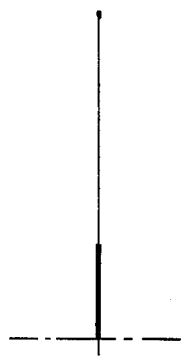
FIGS. 9A–9C are illustrations of deflection of an arm due to flexibility in the transmission and in the arm, itself.
Figure 9B:
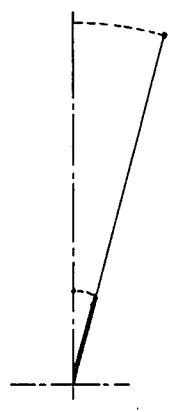
Figure 9C:
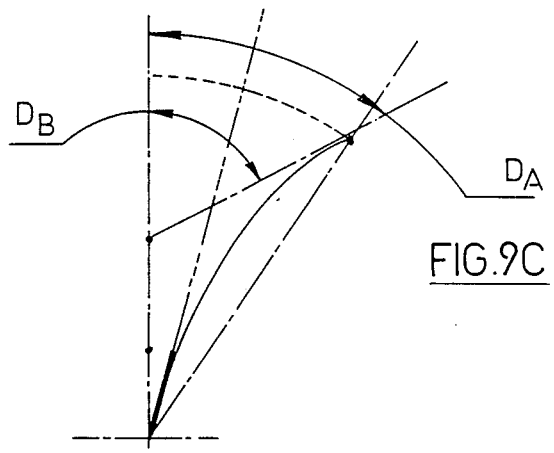

This determination may be understood by reference to FIGS. 9A-9C. FIG. 9A illustrates the first arm 34 prior to application of force thereto. FIG. 9B illustrates the deflection of the first arm 34 due to the lack of stiffness of the transmission. FIG. 9C illustrates the deflection shown in FIG. 9B and in addition thereto, the additional deflection produced by the flexibility of the arm.

Here Force x (distance between the load location and the center of rotation of the first arm 34) is taken to be equal to TL.

$$K_s = D_A/TL \tag{36}$$

This initialization procedure is carried out over a range of forces in both horizontal directions to provide a table of values of $K_s$ for different values of TL.

Figure 6:
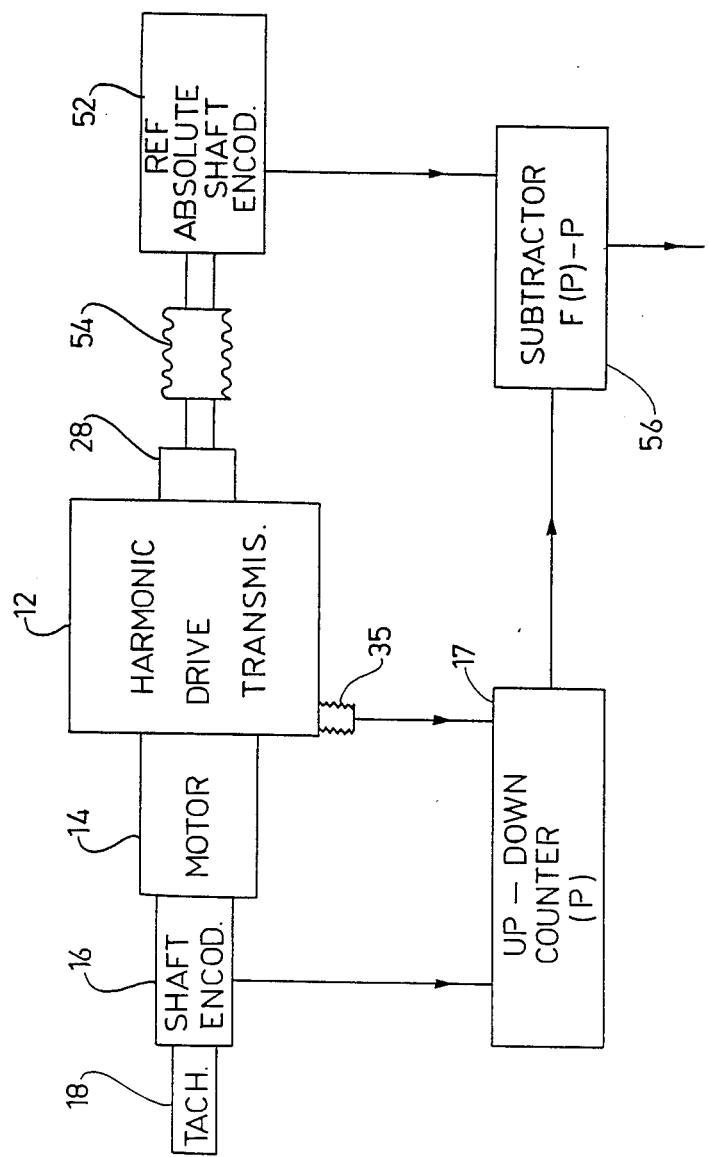
FIG. 6 is a block diagram illustration of apparatus used in an initialization procedure employed in accordance with a preferred embodiment of the invention.

Referring to equation (7), the function F(P) represents the linearization correction between the output of the harmonic drive transmission and the output of the shaft encoder 16 without load. The function F(P) is determined by the following initialization procedure which may employ the apparatus of FIG. 6. This is carried out only once upon installation of the apparatus.

The position of the driving apparatus, sensed by the shaft encoder 16, is first zeroed to the output of the harmonic drive transmission as an absolute angle measured from the zero degree position of the output shaft. This zeroing may be provided by means of an up-down counter 17 receiving an output from shaft encoder 16 and a zero output from a Hall-effect sensor 35 in communication with a magnet 80 (FIG. 2) which is mounted for rotation together with the output shaft 28 of the transmission.

A shaft encoder 52 or other suitable sensor is associated with the output of the harmonic drive transmission 12 typically via a flexible coupling 54 for the purposes of this initialization procedure only. A subtractor 56 receives the output P from up-down counter 17 and the output from shaft encoder 52 and provides an output representing F(P)−P.

The rotary power source 14 is operated to cause the harmonic drive transmission output to rotate through at least about 360 degrees in both clockwise and counter-clockwise directions. At sampling intervals of typically 10 msecs, in order to obtain typically about 2000 samples per revolution of the transmission output, the outputs of the shaft encoder 16 and of the shaft encoder temporarily associated with the harmonic drive transmission 12 output are measured and stored.

A correlation table is thus prepared representing F(P), it being appreciated that two values of F are given for each value of P, the difference between them representing the backlash. The two values are typically averaged and one half of the difference is added or subtracted as appropriate, depending on whether the rotary power source is driving the load or vice versa, thus providing automatic compensation for backlash. This correlation table is illustrated in FIG. 7A. The quantity F(P)−P is illustrated in FIG. 7A for travel in clockwise and counterclockwise directions. The difference between the quantity F(P)−P for travel in the two opposite directions is shown in FIG. 7B and represents the backlash.

Correction of the backlash and the linearization correction are carried out automatically via the function F(P) in expressions (7), (13) and (18).

Referring to equation (13), temperature and velocity dependent constants S, T and W are defined by the following expressions:

$$S = C_2 K_T r \text{ (in Newton-meter/ampere)} \quad (37)$$

$$T = -[C_2 B_m + B_b]/r \text{ (in Newton-meter/radian/sec)} \quad (38)$$

$$W = -[C_2 T_{fm} + T] \text{ (in Newton-meter)} \quad (39)$$

where $C_2$ is given by the following expression:

$$C_2 = \frac{(1-a)(T_{fb} + B_b \times \text{absolute value of } V)}{T_{fa} + B_a \times \text{absolute value of } V} \quad (40)$$

The constants S, T and W are found by an empirical initialization process as follows:

The apparatus of FIGS. 1–3 is operated at constant velocity V to move the first arm 34 from the angle at which $C_1$ was found (equation 34) up through the vertical to the opposite angle as measured from the vertical in either or both clockwise or counterclockwise directions. It is noted that between these two angles neither the rotary power source 14 drives the load or vice versa. At each sampling time, typically every 10 milliseconds, the following parameters are measured and stored:

I (input power in amperes)
V (rotary power source velocity in radian/sec)
P (position of the power source given by shaft encoder 16 in radians)

This procedure is repeated for a multiplicity of different constant velocities.

The unbalance moment $T_{ext}$ of the first arm 34 is given as follows for the above initialization process:

$$SI + TV + W(\text{Sign } V) = T_{ext} \quad (41)$$

This equation is solved as set forth hereinabove using the same general techniques mentioned in connection with Equation (24).

Referring to equation (13), the temperature dependent constant U is defined by the following expression:

$$U = C_2 J_{eq}/r \text{ (in Kg-m)} \quad (42)$$

The constant U is found by an empirical process as follows:

The apparatus of FIGS. 1–3 is operated at constant acceleration A to move the first arm 34 from the angle at which $C_1$ was found (equation 34) up through the vertical to the opposite angle as measured from the vertical in either or both clockwise or counterclockwise directions. It is noted that between these two angles neither the rotary power source 14 drives the load nor vice versa. At each sampling time, typically every 10 milliseconds, the following parameters are measured and stored:

I (input power in amperes)
V (rotary power source velocity in radian/sec) to provide an indication of acceleration using equation (2).
P (position of the power source given by shaft encoder 16 in radians)

This procedure is repeated for a multiplicity of different constant accelerations.

The unbalance moment $T_{ext}$ of the first arm 34 is given as follows for the above initialization process:

$$UA + SI + TV + W(\text{Sign } V) = T_{ext} \quad (43)$$

This equation is solved as set forth hereinabove using the same general techniques mentioned in connection with Equation (24).

This equation is redundant to equation (41) and thus solutions of both equations together provide an improved estimation of S, T, U and W.

Enhanced values of S, T, U and W can be realized by carrying out the initialization process additionally in the following way:

The apparatus of FIGS. 1–3 is operated at constant velocity and acceleration V and A to move the first arm 34 from the angle symmetric about the horizontal axis to the angle at which $C_1$ was found (equation 34) down through the vertical to the opposite angle as measured from the vertical in either or both clockwise or counterclockwise directions.

Carrying out both of these initialization processes gives appropriate values for S, T U and W for the case when there exists a transition from case A to case C and for the case when there exists a transition from case B to case C.

The above initialization procedures are carried out for a multiplicity of different temperatures to enable extrapolation of the parameters for all temperatures $T_1°$ and $T_2°$ over a given range.

Typical numerical values of the various constants for the above-described case are given as follows for the case where $T_1° = 30$ degrees C., and $T_2° = 40$ degrees C.:

r = 100
G = 13.303
H = −1.1×10⁻⁵
J = −0.4×10⁻⁵
K = −4
$C_1$ = −13.1
L = 14.486
M = −1.4×10⁻⁵
N = −0.47×10⁻⁵
Q = −9.86
and for V = 157 rad/sec.
S = 14.07
T = −1.2×10⁻⁵
U = −0.43×10⁻⁵
W = −7.1

$K_s$ for rigid arm and transmission = 12,026 Newton-meter/rad.

The foregoing explanation of the derivation of the above constants was based on a rigid arm. If instead of a rigid arm, a flexible arm is employed, the same derivation applies with the value of $K_s$ being appropriately different to correspond to the flexibility of the arm. In such a case, a typical value of $K_s$ is 308 Newton-meter/rad. Constants J, N and U may also be corrected accordingly, but this correction may be neglected.

In accordance with the present invention, the inaccuracy of the load position is reduced by a factor of 1/20 to 1/50 as compared with prior art systems. The present invention provides typical residual error of about 0.3 milliradian (peak to peak) and does not require sensors at the output of the transmission during operation thereof.

It will be appreciated that in accordance with the present invention, any transmission of known characteristics, any unknown load and any arm of known stiffness coefficient $K_s$ may be employed. Appropriate load position, force and velocity information will be provided.

This information may be used for position correction feedback purposes to the rotary power source in a conventional way in order to provide extremely precise positioning of the load. Using the invention in this way, dynamic tracking of the load may be realized for any desired trajectory. This is particularly useful in CAD/CAM applications wherein the trajectory is specified by spatial coordinates. The load may thus be accurately placed where indicated by the coordinates notwithstanding flexibility in the positioning apparatus and the existence of an unknown load. A high level of repeatability is thereby attained even for unknown loads. Alternatively or additionally, this information may be used in an open loop framework for load location.

It will be appreciated that the present invention is also equally applicable to cases of changing load, unknown changing moment of inertia and unknown forces. A particular unknown force is the unbalanced torque of the arm itself.

The apparatus of the present invention is operative to indicate the position of the load even when the positioning apparatus is at rest and the overall external torque is smaller than the static friction. This is achieved by the following technique. When the load is at rest, the input power I is increased or decreased until quasi-static movement of the load is reached. Thereafter the technique set forth in FIG. 5 is then carried out, as described hereinabove.

It is noted from FIG. 7B that the present invention provides automatic backlash correction even for backlash which varies with position.

It may be appreciated from a consideration of FIG. 9C that $K_s$ may be defined in two ways:

If $K_s$ is defined as in expression (36), the position of the output is corrected but its angular orientation is not. Should it be desired to correct also for the angular orientation of the output, a different definition of $K_s$ is necessary. This definition is set forth hereinbelow:

$$K_s = D_B/TL \tag{44}$$

where D is the angular displacement of the tangent to the end of the arm 34. According to the present invention, a correction may be made on the basis of either expression (36) or expression (44) or on the basis of a desired compromise or selection therebelow.

Figure 8:
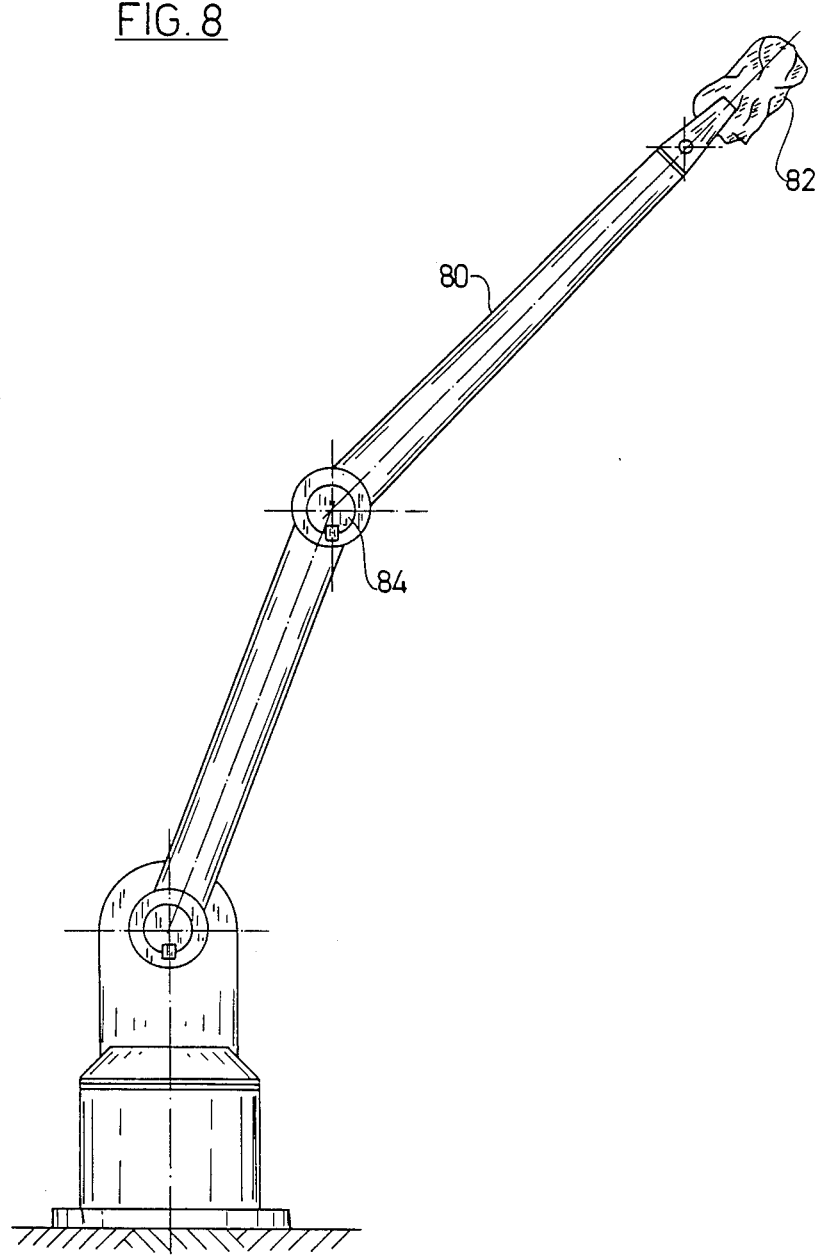
FIG. 8 is an end view illustration of positioning apparatus constructed and operative in accordance with a preferred embodiment of the present invention and having multiple arms.

Considering now a structure such as that illustrated in FIG. 8, wherein a second motor driven arm 80 is also provided in series with first arm 34, it may be appreciated that the apparatus of the present invention is able to provide an accurate output indication of the position, torque and velocity of a load 82 supported on arm 80 without requiring any additional information about arm 80 or load 82 or their motion. Thus, it may be understood that control information relative to the operation of a motor 84 driving second arm 80 need not be considered at all.

The foregoing is true because the position, velocity and forces of the second arm 80 and its drive and load all fall within the definitions of unknown force, unbalanced torque and changing moment of inertia of the load, which were taken into account in the calculations of PL, VL and TL set forth hereinabove.

Nevertheless, where the apparatus of FIG. 8 is employed, it is possible, if desired to provide a correction for $K_s$ according to expression (36) to the driving apparatus 14 and to provide a correction for $K_s$ according to expression (44) to the motor 84.

It will be appreciated that from the velocity of the load, VL it is possible to determine the acceleration of the load, AL by the following equation:

$$AL = \frac{VL(t) - VL(t - T)}{T} \tag{45}$$

It may thus be appreciated that the mass of the load can be determined for the embodiment of FIGS. 1-3 in accordance with the present invention according to the following expression:

$$MASS = \frac{TL - JL \times AL - T_{ext}}{D \times g} \tag{46}$$

ps where
$T_{ext}$ is given by expression (25)
JL is the fixed moment of inertia of the load 36
D is the distance from the center of rotation to the load 36.

It may be appreciated that for the embodiment of FIGS. 1-3, it is possible to provide feed forward velocity information according to the present invention in accordance with the following expression:

$$VFF = \text{Square root of } \{TL^2/(K_s \times JL)\} \tag{47}$$

It will be appreciated by persons skilled in the art that the present invention is not limited to electrical driving apparatus or to rotary driving apparatus. Any suitable type of driving apparatus may be employed. For example, electrical motors of any suitable type including electrical linear motors, and pneumatic or hydraulic motors of any suitable type including linear motors may be employed. Where fluidic motors, such as pneumatic or hydraulic motors, are employed, measurement of input current is replaced by a measurement of input pressure or flow.

It will be appreciated by persons skilled in the art that the present invention is not limited by what has been parcularly shown and described hereinabove. Rather the scope of the present invention is defined only by the claims which follow:

We claim:
1. A positioning apparatus comprising:
driving means;

transmission means coupled to said driving means and to a load;

position sensing means coupled to said driving means;

means for sensing input power to said driving means;

inaccuracy compensation control means receiving a first input from said position sensing means indicating the position of said driving means and a second input from said means for sensing input power and providing a compensated output indication indicating the position of the load on the basis of information regarding non-linearities in position changes between the driving means and the load including information indicative of whether or not the load is driving the driving apparatus or the driving means is driving the load.

2. The positioning apparatus according to claim 1 also comprising means for indicating the force at the output of the transmission means on the basis of information regarding nonlinearities in position changes between the driving means and the load including information indicative of whether or not the load is driving the driving means or the driving apparatus is driving the load.

3. The positioning apparatus according to claim 1 also comprising means for indicating the velocity of the load on the basis of information regarding non-linearities in position changes between the driving means and the load including information indicative of whether or not the load is driving the driving means or the driving means is driving the load.

4. The positioning apparatus according to claim 1 also comprising means for indicating the velocity and the force at the output of the transmission means on the basis of information regarding non-linearities in position changes between the driving means and the load including information indicative of whether or not the load is driving the driving means or the driving means is driving the load.

5. Positioning apparatus according to claim 1 and wherein said inaccuracy compensation control means comprises means for determining which one of the following three conditions exists:

A. the driving means is driving the load;
B. the load is driving the driving means;
C. the driving means is not driving the load and the load is not driving the driving means.

6. The positioning apparatus according to claim 5, wherein said inaccuracy compensation control means also comprises means for providing an output indication of at least one of the following characteristics of the load in accordance with at least one of the following expressions when condition A exists:

$$PL = R\{GI + HV + JA + K(\text{Sign } V)\} + F(P, T°)$$

$$TL = \{GI + HV + JA + K(\text{Sign } V)\}$$

$$VL = FK(PL)$$

where G, H, J and K are all temperature dependent constants, R is a function of $\{GI + HV + JA + K(\text{Sign } V)\}$, $F(P, T°)$ is a linearization table function of P and T°, and FK is a function which gives velocity as the function of position and force; PL is the position of the load, I is the input power, V is the velocity of the driving means, A is the acceleration of the driving means, P is the position of the driving means, T is the temperature of the transmission means, TL is the torque of the load, and VL is the velocity of the load.

7. The positioning apparatus according to claim 5 wherein said inaccuracy compensation control means also comprises means for providing an output indication of at least one of the following characteristics of the load in accordance with at least one of the following expressions when condition B exists:

$$PL = R\{LI + MV + NA + Q(\text{Sign } V)\} + F(P, T°)$$

$$TL = \{LI + MV + NA + Q(\text{Sign } V)\}$$

$$VL = FK(PL)$$

where L, M, N and Q are all temperature dependent constants, R is an empirical function of $\{LI + MV + NA + Q(\text{Sign } V)\}$, $F(P, T°)$ is an empirical linearization table function of P and T°, FK is a function which gives velocity as the function of change in position over time, I is the input power, V is the velocity of the driving means, A is the acceleration of the driving means, PL is the position of the load, TL is the torque of the load, and VL is the velocity of the load.

8. The positioning apparatus according to claim 5 wherein said inaccuracy compensation control means also comprises means for providing an output indication of at least one of the following characteristics of the load in accordance with at least one of the following expressions when condition C exists:

$$PL = R\{SI + TV + UA + W(\text{Sign } V)\} + F(P, T°)$$

$$TL = \{SI + TV + UA + W(\text{Sign } V)\}$$

$$VL = FK(PL)$$

where I is the input power, V is the velocity of the driving means, A is the acceleration of the driving means, PL is the position of the load, TL is the torque of the load, and VL is the velocity of the load, S, T, U and W are temperature and velocity dependent constants, R is an empirical function of $\{SI + TV + UA + W(\text{Sign } V)\}$, $F(P, T°)$ is an empirical linearization table function of P and T°, and FK is a function which gives velocity as the function of change in position over time.

9. The positioning apparatus according to claim 5 wherein said inaccuracy compensation control means also comprises means for providing backlash compensation on the basis of said information indicative of whether or not the load is driving the driving means or the driving means is driving the load.

10. The positioning apparatus according to claim 5 wherein said inaccuracy compensation control means also comprises indicating means operative to indicate the position of the load even when the positioning apparatus is at rest, said indicating means comprising means for increasing or decreasing the input power until quasistatic movement of the load is reached.

11. The positioning apparatus according to claim 1 wherein said inaccuracy compensation control means also comprises means for providing backlash compensation on the basis of said information indicative of whether or not the load is driving the driving means or the driving means is driving the load.

12. The positioning apparatus according to claim 1 wherein said inaccuracy compensation control means also comprises indicating means operative to indicate the position of the load even when the positioning apparatus is at rest, said indicating means comprising means for increasing or decreasing the input power until quasi-static movement of the load is reached.

13. A positioning apparatus comprising:
   driving means;
   transmission means coupled to said driving means and to a load;
   position sensing means coupled to said driving means;
   means for sensing input power to said driving means;
   inaccuracy compensation control means receiving a first input from said position sensing means indicating the position of said driving means and a second input from said means for sensing input power and providing a compensated output indication indicating the velocity of the load on the basis of information regarding non-linearities in position changes between the driving means and the load including information indicative of whether or not the load is driving the driving means or the driving apparatus is driving the load.

14. The positioning apparatus according to claim 13 also comprising means for indicating the force at the output of the transmission means on the basis of information regarding nonlinearities in position changes between the driving means and the load including information indicative of whether or not the load is driving the driving means or the driving means is driving the load.

15. Positioning apparatus according to claim 13 and wherein said inaccuracy compensation control means comprises means for determining which one of the following three conditions exists:
   A. the driving means is driving the load;
   B. the load is driving the driving means;
   C. the driving means is not driving the load and the load is not driving the driving means.

16. The positioning apparatus according to claim 15 wherein said inaccuracy compensation control means also comprises means for providing an output indication of at least one of the following characteristics of the load in accordance with at least one of the following expressions when condition A exists:

$$PL = R\{GI + HV + JA + K(\text{Sign } V)\} + F(P, T°)$$

$$TL = \{GI + HV + JA + K(\text{Sign } V)\}$$

$$VL = FK(PL)$$

where G, H, J and K are all temperature dependent constants, R is a function of $\{GI+HV+JA+K(\text{Sign } V)\}$, $F(P, T°)$ is a linearization table function of P and T°, and FK is a function which gives velocity as the function of position and force; PL is the position of the load, I is the input power, V is the velocity of the driving means, A is the acceleration of the driving means, P is the position of the driving means, T° is the temperature of the transmission means, TL is the torque of the load, and VL is the velocity of the load.

17. The positioning apparatus according to claim 15 wherein said inaccuracy compensation control means also comprises means for providing an output indication of at least one of the following characteristics of the load in accordance with at least one of the following expressions when condition B exists:

$$PL = R\{LI + MV + NA + Q(\text{Sign } V)\} + F(P, T°)$$

$$TL = \{LI + MV + NA + Q(\text{Sign } V)\}$$

$$VL = FK(PL)$$

where L, M, N and Q are all temperature dependent constants, R is an empirical function of $\{LI+MV+NA+Q(\text{Sign } V)\}$, $F(P, T°)$ is an empirical linearization table function of P and T°, FK is a function which gives velocity as the function of change in position over time, I is the input power, V is the velocity of the driving means, A is the acceleration of the driving means, PL is the position of the load, TL is the torque of the load, and VL is the velocity of the load.

18. The positioning apparatus according to claim 15 wherein said inaccuracy compensation control means also comprises means for providing an output indication of at least one of the following characteristics of the load in accordance with at least one of the following expressions when condition C exists:

$$PL = R\{SI + TV + UA + W(\text{Sign } V)\} + F(P, T°)$$

$$TL = \{SI + TV + UA + W(\text{Sign } V)\}$$

$$VL = FK(PL)$$

where I is the input power, V is the velocity of the driving means, A is the acceleration of the driving means, PL is the position of the load, TL is the torque of the load, and VL is the velocity of the load, S, T, U and W are temperature and velocity dependent constants, R is an empirical function of $\{SI+TV+UA+W(\text{Sign } V)\}$, $F(P, T°)$ is an empirical linearization table function of P and T°, and FK is a function which gives velocity as the function of change in position over time.

19. The positioning apparatus according to claim 15 wherein said inaccuracy compensation control means also comprises means for providing backlash compensation on the basis of said information indicative of whether or not the load is driving the driving means or the driving means is driving the load.

20. The positioning apparatus according to claim 15 wherein said inaccuracy compensation control means also comprises indicating means operative to indicate the position of the load even when the positioning apparatus is at rest, said indicating means comprising means for increasing or decreasing the input power until quasi-static movement of the load is reached.

21. The positioning apparatus according to claim 13 wherein said inaccuracy compensation control means also comprises means for providing backlash compensation on the basis of said information indicative of whether or not the load is driving the driving means or the driving means is driving the load.

22. The positioning apparatus according to claim 13 wherein said inaccuracy compensation control means also comprises indicating means operative to indicate the position of the load even when the positioning apparatus is at rest, said indicating means comprising means for increasing or decreasing the input power until quasi-static movement of the load is reached.

23. A positioning apparatus comprising:
   driving means;
   transmission means coupled to said driving means and to a load;
   position sensing means coupled to said driving means;
   means for sensing input power to said driving means;

inaccuracy compensation control means receiving a first input from said position sensing means indicating the position of said driving means and a second input from said means for sensing input power and providing a compensated output indication indicating the force at the output of the transmission means on the basis of information regarding nonlinearities in position changes between the driving means and the load including information indicative of whether or not the load is driving the driving means or the driving means is driving the load.

24. The positioning apparatus according to claim 23 wherein said inaccuracy compensation control means comprises means for determining which one of the following three conditions exists:

A. the driving means is driving the load;
B. the load is driving the driving means;
C. the driving means is not driving the load and the load is not driving the driving means.

25. The positioning apparatus according to claim 24 wherein said inaccuracy compensation control means also comprises means for providing an output indication of at least one of the following characteristics of the load in accordance with at least one of the following expressions when condition A exists:

$$PL = R\{GI + HV + JA + K(\text{Sign } V)\} + F(P, T°)$$

$$TL = \{GI + HV + JA + K(\text{Sign } V)\}$$

$$VL = FK(PL)$$

where G, H, J and K are all temperature dependent constants, R is a function of $\{GI+HV+JA+K(\text{Sign } V)\}$, $F(P, T°)$ is a linearization table function of P and T°, and FK is a function which gives velocity as the function of position and force; PL is the position of the load, I is the input power, V is the velocity of the driving means, A is the acceleration of the driving means, P is the position of the driving means T° is the temperature of the transmission means, TL is the torque of the load, and VL is the velocity of the load.

26. The positioning apparatus according to claim 24 and wherein said inaccuracy compensation control means also comprises means for providing an output indication of at least one of the following characteristics of the load in accordance with at least one of the following expressions when condition B exists:

$$PL = R\{LI + MV + NA + Q(\text{Sign } V)\} + F(P, T°)$$

$$TL = \{LI + MV + NA + Q(\text{Sign } V)\}$$

$$VL = FK(PL)$$

where L, M, N and Q are all temperature dependent constants, R is an empirical function of $\{LI+MV+NA+Q(\text{Sign } V)\}$, $F(P, T°)$ is an empirical linearization table function of P and T°, FK is a function which gives velocity as the function of change in position over time, I is the input power, V is the velocity of the driving means, A is the acceleration of the driving means, PL is the position of the load, TL is the torque of the load, and VL is the velocity of the load.

27. The positioning apparatus according to claim 24 wherein said inaccuracy compensation control means also comprises means for providing an output indication of at least one of the following characteristics of the load in accordance with at least one of the following expressions when condition C exists:

$$PL = R\{SI + TV + UA + W(\text{Sign } V)\} + F(P, T°)$$

$$TL = \{SI + TV + UA + W(\text{Sign } V)\}$$

$$VL = FK(PL)$$

where I is the input power, V is the velocity of the driving means, A is the acceleration of the driving means, PL is the position of the load, TL is the torque of the load, and VL is the velocity of the load, S, T, U and W are temperature and velocity dependent constants, R is an empirical function of $\{SI+TV+UA+W(\text{Sign } V)\}$, $F(P, T°)$ is an empirical linearization table function of P and T°, and FK is a function which gives velocity as the function of change in position over time.

28. The positioning apparatus according to claim 24 wherein said inaccuracy compensation control means also comprises means for providing backlash compensation on the basis of said information indicative of whether or not the load is driving the driving means or the driving means is driving the load.

29. The positioning apparatus according to claim 24 wherein said inaccuracy compensation control means also comprises indicating means operative to indicate the position of the load even when the positioning apparatus is at rest, said indicating means comprising means for increasing or decreasing the input power until quasi-static movement of the load is reached.

30. The positioning apparatus according to claim 23 wherein said inaccuracy compensation control means also comprises means for providing backlash compensation on the basis of said information indicative of whether or not the load is driving the driving means or the driving means is driving the load.

31. The positioning apparatus according to claim 33 wherein said inaccuracy compensation control means also comprises indicating means operative to indicate the position of the load even when the positioning apparatus is at rest, said indicating means comprising means for increasing or decreasing the input power until quasi-static movement of the load is reached.

* * * * *